United States Patent [19]

Seyerl et al.

[11] Patent Number: 5,223,172
[45] Date of Patent: Jun. 29, 1993

[54] HARDENER FOR EPOXIDE RESIN MASSES

[75] Inventors: Joachim v. Seyerl, Seeon; Horst Michaud, Trostberg, both of Fed. Rep. of Germany

[73] Assignee: SKW Trostberg Aktiengesellschaft, Trostberg, Fed. Rep. of Germany

[21] Appl. No.: 787,761

[22] Filed: Nov. 6, 1991

Related U.S. Application Data

[63] Continuation of Ser. No. 730,025, Jul. 12, 1991, abandoned, which is a continuation of Ser. No. 211,154, Jun. 22, 1988, abandoned, which is a continuation of Ser. No. 97,351, Sep. 8, 1987, abandoned, which is a continuation of Ser. No. 845,476, Mar. 27, 1986, abandoned, which is a continuation of Ser. No. 669,375, Nov. 8, 1984, abandoned.

[30] Foreign Application Priority Data

Nov. 11, 1983 [DE] Fed. Rep. of Germany ....... 3340788

[51] Int. Cl.⁵ .................. C08G 59/40; C08G 59/44
[52] U.S. Cl. ......................... 252/182.12; 252/182.11; 523/400; 523/427; 523/428
[58] Field of Search ............. 252/383, 182.11, 182.12; 564/104; 523/400, 427, 428

[56] References Cited

U.S. PATENT DOCUMENTS

| | | | |
|---|---|---|---|
| 2,407,151 | 9/1946 | Glogau | 252/397 X |
| 3,728,302 | 4/1973 | Helm | 528/120 X |
| 3,882,064 | 5/1975 | Pregmon | 525/524 X |
| 3,914,204 | 10/1975 | Helm et al. | 528/120 |
| 4,017,447 | 4/1977 | Larsen et al. | 525/530 X |
| 4,049,744 | 9/1977 | Masters | 525/930 X |
| 4,169,187 | 9/1979 | Glazar | 525/482 X |
| 4,182,732 | 1/1980 | Fry | 525/482 |
| 4,491,595 | 1/1985 | Niemers et al. | 564/104 X |

OTHER PUBLICATIONS

Physical Chemistry 6th edition, Robert A. Alberty, 1983.
Hawley, G. G. *The Condensed Chemical Dictionary*, Van Nostrand Reinhold Co., N.Y., Ninth Ed, (1977) pp. 1, 331, 144.
Grant, Julius (Ed.), *Hackh's Chemical Dictionary*, Fourth Ed., 1972, McGraw-Hill, pp. 402, 659, 735.

*Primary Examiner*—Robert L. Stoll
*Assistant Examiner*—Valerie D. Fee
*Attorney, Agent, or Firm*—Felfe & Lynch

[57] ABSTRACT

The present invention provides a hardner for epoxide resin masses based on dicyandiamide, wherein it contains a) dicyandiamide with a particle size of $\geq 90\% \leq 10$ μm. and
b) 0.1 to 30% by weight of silicon dioxide and/or of an oxide of a metal of Group IIA or IIB of the Periodic Table with a large specific surface area.

7 Claims, No Drawings

HARDENER FOR EPOXIDE RESIN MASSES

This application is a continuation of application Ser. No. 07/730,025, filed Jul. 12, 1991, now abandoned; which is a continuation of Ser. No. 07/211,154, filed Jun. 22, 1988, now abandoned; which is a continuation of Ser. No. 097,351, filed Sep. 8, 1987, now abandoned; which is a continuation of Ser. No. 845,476, filed Mar. 27, 1986, now abandoned; which is a continuation of Ser. No. 669,375, filed Nov. 8, 1984, now abandoned.

The present invention is concerned with a hardner for epoxide resin masses based on dicyandiamide.

It is known to use dicyandiamide for the hardening of epoxide resins (cf. U.S. Pat. Nos. 2,637,715 and 3,391,113). The advantages of the dicyandiamide are, in particular, its toxicological harmlessness and the absence of smell, as well as its chemically inert behaviour, sb that the resin-hardner mixture has a good storage stability.

The disadvantages of dicyandiamide are its poor solubility and the non-optimal distributability of the hardner in the epoxide resin which, for example, can lead to an increased consumption of hardner. However, this increased amount used gives rise, in turn, to the effect that the hardened regions with a high content of non-consumed hardner and thus can have defects in the end product.

Attempts have not been lacking to improve this problem of the poor distributability in liquid epoxide resins or in epoxide resins melting at a higher temperature. Depending upon the intended use, the following ways have been employed:

- the use of an appropriate solvent or solvent mixture for the production of impregnation solutions from epoxide resin and hardner (cf. Federal Republic of Germany Patent Specification No. 30 26 706 and German Democratic Republic Patent Specification No. 133 955);
- the use of substituted dicyandiamides with improved distributability in epoxide resin masses (cf., for example, French Patent Specification No. 22 07 911); and
- the use of dicyandiamide dispersions in liquid epoxide resin mixtures.

Whereas, according to the first way, only a few solvent mixtures could be found which display the necessary criteria, such as good solubility or good compatibility with the epoxide resin mixtures, in the case of the second way, the provision of substituted dicyandiamides is uneconomical because the production of these products gives rise to high operational and investment costs. In the case of the last-mentioned way, the difficulty arises that dicyandiamide must be used which is as finely divided as possible in order to achieve a good distribution in powdered epoxide resin-hardner mixtures or to obtain dispersions in liquid epoxide resin mixtures and, on the other hand, finely-divided dicyandiamide has a marked tendency to cake so that finely-divided dicyandiamide forms agglomerates within a very short space of time which also can scarcely be broken up again by grinding. In the case of dicyandiamide suspensions, this agglomeration of finely-ground dicyandiamide leads to the formation of comparatively large flocks, which give rise to considerable problems in the epoxide resin mixtures.

Therefore, it is an object of the present invention to provide a hardner for epoxide resin masses based on dicyandiamide which does not display the above-mentioned known disadvantages, which is characterised by good application-technical properties and which can be produced economically.

Thus, according to the present invention, there is provided a hardner for epoxide resin masses based on dicyandiamide, wherein it contains a) dicyandiamide with a particle size of $\geq 90\%$ $\leq 10$ $\mu$m. and b) 0.1 to 30% by weight of silicon dioxide and/or of an oxide of a metal of Group IIA or IIB of the Periodic Table with a large specific surface area.

Surprisingly, we have found that the hardner according to the present invention for epoxide resin masses has an improved distributability in the epoxide resin, as well as an increased storage stability in the epoxide resin-hardner dispersions. Furthermore, the additions of silicon dioxide and/or of oxides of metals of Group IIA or IIB of the Periodic Table bring about a sometimes considerable shortening of the gel times in comparison with normal dicyandiamide, which was also not foreseeable.

The epoxide resin hardner according to the present invention based on dicyandiamide consists of a dicyandiamide with a particle size of $\geq 90\%$ $\leq 10$ $\mu$m., as well as silicon dioxide and/or an oxide of a metal of Group IIA or IIB of the Periodic Table with a large specific surface area, the specific surface area preferably being at least 50 m$^2$/g. according to BET, in order to achieve the action according to the present invention. Types of silicon dioxide which are commercially available under the trade name Aerosil (Degussa), as well as HDK (Wacker), have proved to be especially advantageous.

Especially preferred oxides of metals of Group IIA and IIB of the Periodic Table include magnesium oxide, as well as mixtures thereof but, in principle, other oxides, for example those of barium or of strontium, can also be used.

The amount of the silicon dioxide or of the oxide of a metal of Group IIA or IIB of the Periodic Table is 0.1 to 30% by weight and preferably from 0.2 to 20% by weight, referred to the weight of the dicyandiamide.

The production of the epoxide resin hardner according to the present invention preferably takes place by continuously dosing the silicon dioxide and/or the oxide of a metal of Group IIA or IIB of the Periodic Table to the dicyandiamide before grinding to the desired grain size so that the metal oxides have the same particle size distribution as the dicyandiamide.

This prevents the finely-ground dicyandiamide from clumping together immediately after the grinding procedure, which would result in the formation of undesired agglomerates. Thus, the mixing of the components can be completed in one step. The grinding of the dicyandiamide and/or of the metal oxides can be carried out without problems in conventional technical devices, such as grader mills or the like, i.e. without separation of dicyandiamide and of the metal oxides during the grinding process.

The dicyandiamide-containing epoxide hardner according to the present invention, which has a bulk density of 300 to 500 g./liter, can be optimally distributed in solid or liquid epoxide resins, it thereby being possible to reduce the amount of hardner in comparison with conventional hardners based on dicyandiamide. We have found that amounts of 3 to 6% by weight, referred to the epoxide equivalent weight, are sufficient.

The hardening reaction with the hardner according to the present invention can be additionally activated with conventional hardening accelerators, for example 2-methylimidazole, substituted ureas (monouron, diuron), dimethylbenzylamine or substituted methylenedianilines. The hardened epoxide resin has a clearly improved chemical resistance and adhesion in comparison with products produced with conventional dicyandiamide-containing hardners.

The following Examples are given for the purpose of illustrating the present invention. For comparison purposes, epoxide resin hardners based on dicyandiamide are produced by grinding dicyandiamide with the following additives and compared with one another:

hardner a) dicyandiamide with 1.3% by weight silicon dioxide HDK N 20 with a specific surface area of 200 m$^2$/g. (Wacker)

hardner b): dicyandiamide with 10.0% by weight calcium oxide hardner c): dicyandiamide with 0.8% by weight magnesium oxide hardner d): dicyandiamide with 5.0% by weight zinc oxide hardner e): dicyandiamide without addition

EXAMPLE 1

Determination of the Average Grain Diameter by Means of X-ray Electron Microscopy hardner a): 4–5 μm. (little agglomeration)
hardner b): 4–5 μm. (scarcely any agglomeration)
hardner c): 4–5 μm. (scarcely any agglomeration)
hardner d): 4–5 μm. (scarcely any agglomeration)
hardner e): 15 μm. (agglomerates up to 40 μm.).

EXAMPLE 2

Determination of the Particle Size by Wet Sieving with a Sieve Mesh Size of 10 μm For the wet sieving, there is produced a 15% suspension of the qualities obtained in ethyl acetate saturated with dicyandiamide. For homogeneous mixing, the suspension is treated for 5 minutes in an ultrasonic bath and then filtered through a vibrating, previously weighed out filter with a mesh size of 10 μm.

After the filter has been rewashed with a further 50 g. ethyl acetate, it is dried and reweighed. From this is given the percentage content of dicyandiamide with a grain diameter of less than 10 μm.

hardner a): 99% <10 μm.
hardner b): 98% <10 μm.
hardner c): 98% <10 μm.
hardner d): 98% <10 μm.
hardner e): 45% <10 μm.

EXAMPLE 2

Determination of the Gel Times

The gel times of various epoxide hardners according to the present invention are determined with Epikote 1007 and compared with conventional dicyandiamide with an average particle size of 80 μm.

| hardner (5% by wt. dicyandiamide ref to Epikote 1007) | gel time at 180° C. in min. |
| --- | --- |
| dicyandiamide (80 μm.) | 7.0 |
| epoxide resin hardner a) | 6.0 |
| epoxide resin hardner b) | 5.0 |
| epoxide resin hardner c) | 6.0 |
| epoxide resin hardner d) | 5.0 |
| dicyandiamide (80 m.) + 0.25% 2-methylimidazole | 3.0 |
| epoxide resin hardner a) + 0.25 2-methylimidazole | 2.5 |

EXAMPLE 4

Determination of the Storage Stability

Dispersions are produced each of 4% of the hardner according to the present invention in Epikote 828 and compared with a dispersion of 4% dicyandiamide (80 μm.) within a period of time of 4 weeks:

| hardner | dispersion after 4 weeks storage |
| --- | --- |
| dicyandiamide (80 μm) | almost all the material deposited |
| hardner a) | stable dispersion |
| hardner b) | stable dispersion |
| hardner c) | stable dispersion |
| hardner d) | stable dispersion |
| hardner e) | about 50% deposited as flocks |

EXAMPLE 5

The dispersions described in Example 4 are applied in the form of a lacquer layer to a cleaned steel sheet and hardened at 180° C. for one hour, the following observations thereby being made:

dicyandiamide (80 m.): punctate coating with unused hardner, not completely hardened
hardner a): smooth, transparent coating
hardner b): smooth, white-pigmented coating
hardner c): smooth, almost transparent coating
hardner d): smooth, slightly pigmented coating
hardner e): uneven, slightly punctate coating with unused hardner

We claim:

1. A composition comprising:
a dispersion of a liquid epoxide resin with a dicyandiamide hardener distributed therein, said hardener consisting essentially of
a) dicyandiamide having a particle size distribution wherein at least 90% of the dicyandiamide particles are less than, or equal to, 10 microns; and
b) 0.1 to 30% by weight, referred to the weight of the dicyandiamide, of at least one oxide selected from the group consisting of silicon dioxide, calcium oxide, magnesium oxide, and zinc oxide.

2. The composition of claim 1 wherein the hardener contains 0.2 to 20 wt. % of said least one oxide.

3. The composition of claim 1 wherein the least one oxide has a specific surface area according to BET of at least 50 m$^2$/g.

4. The composition of claim 1 wherein the oxide is at least one of magnesium oxide, calcium oxide and zinc oxide.

5. A process for the production of a dicyandiamide based hardener for and epoxide resin dispersion, the hardener consisting essentially of dicyandiamide with a particle size distribution of at least 90% of the dicyandiamide particles less than, or equal to, 10 microns and 0.1 to 30% wt. %, referred to the weight of the dicyandiamide, of at least one oxide selected from the group consisting of silicon dioxide, calcium oxide, magnesium oxide and zinc oxide, the process comprising:
measuring the oxide into the dicyandiamide to form a mixture; and thereafter;
grinding the mixture so that the mixture has a particle size distribution so that at least 90% is less than or equal to 10 microns.

6. The process of claim 5 wherein the oxide is at least one of magnesium oxide, calcium oxide; and zinc oxide.

7. The process of claim 5 wherein 0.2 to 20% by weight of said least one oxide is used.

* * * * *

REEXAMINATION CERTIFICATE (3637th)

United States Patent [19]

Seyerl et al.

[11] B1 5,223,172

[45] Certificate Issued Sep. 29, 1998

[54] HARDENER FOR EPOXIDE RESIN MASSES

[75] Inventors: Joachim v. Seyerl, Seeon; Horst Michaud, Trostberg, both of Germany

[73] Assignee: SKW Trostberg Aktiengesellschaft, Trostberg, Germany

Reexamination Request:
No. 90/003,367, Mar. 24, 1994

Reexamination Certificate for:
Patent No.: 5,223,172
Issued: Jun. 29, 1993
Appl. No.: 787,761
Filed: Nov. 6, 1991

Related U.S. Application Data

[63] Continuation of Ser. No. 730,025, Jul. 12, 1991, abandoned, which is a continuation of Ser. No. 211,154, Jun. 22, 1988, abandoned, which is a continuation of Ser. No. 97,351, Sep. 8, 1987, abandoned, which is a continuation of Ser. No. 845,476, Mar. 27, 1986, abandoned, which is a continuation of Ser. No. 669,375, Nov. 8, 1984, abandoned.

[30] Foreign Application Priority Data

Nov. 11, 1983 [DE] Germany .................. 3340788

[51] Int. Cl.$^6$ .................. C08G 59/40; C08G 59/44
[52] U.S. Cl. .................. 252/182.12; 252/182.11; 523/400; 523/427; 523/428

[58] Field of Search .................. 252/182.11, 182.12; 523/400, 427, 428

[56] References Cited

U.S. PATENT DOCUMENTS

| | | | |
|---|---|---|---|
| 3,882,064 | 5/1975 | Pregmon | 260/28 |
| 4,022,440 | 5/1977 | Kawamura et al. | 259/192 |
| 4,066,625 | 1/1978 | Bolger | 260/59 R |
| 4,169,187 | 9/1979 | Glazar | 428/418 |
| 4,459,398 | 7/1984 | Dearlove et al. | 528/1 |

FOREIGN PATENT DOCUMENTS

| | | |
|---|---|---|
| 57-47323 | 3/1982 | Japan. |
| 57-102920 | 6/1982 | Japan. |

OTHER PUBLICATIONS

The Condensed Chemical Dictionary, 9$^{th}$ Edition, Van Nostrand Reinhold Company, 1977, p. 144.

*Primary Examiner*—Cynthia Harris Kelly

[57] ABSTRACT

The present invention provides a hardner for epoxide resin masses based on dicyandiamide, wherein it contains a) dicyandiamide with a particle size of $\geq 90\%$ $\leq 10$ μm. and b) 0.1 to 30% by weight of silicon dioxide and/or of an oxide of a metal of Group IIA or IIB of the Periodic Table with a large specific surface area.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

* * * * *